Patented June 10, 1952

2,600,198

UNITED STATES PATENT OFFICE 2,600,198

METHOD OF PREPARING ORGANOHALO-GENOSILANES

Stuart D. Brewer, Burnt Hills, N. Y., assignor to General Electric Company, a corporation of New York No Drawing. Application September 21, 1949, Serial No. 117,070

8 Claims. (Cl. 260—448.2)

This invention relates to the preparation of organohalogenosilanes. More particularly, it is concerned with a method for obtaining increased yields of aromatic halogenosilanes which comprises (1) effecting reaction between (a) an aromatic hydrocarbon and (b) a halogenosilane containing at least one silicon-bonded hydrogen and at least one silicon-bonded halogen, said reaction being effected in the presence of a Friedel-Crafts type catalyst selected from the class consisting of halides of aluminum, halides of boron, halides of zinc, and mixtures thereof, (2) removing the desired formed aromatic halogenosilane from the reaction product, (3) adding to the balance of the reaction product an amount of aromatic hydrocarbon and halogenosilane described above at least substantially equal to the decrease in weight caused by the removal of evolved hydrogen and desired aromatic halogenosilane from the previously treated reaction mixture and in the stoichiometric proportions required for the formation of the desired aromatic halogenosilanes, and (4) effecting reaction again between the newly added ingredients and the balance of the aforesaid reaction product to form additional quantities of aromatic halogenosilane.

It has been disclosed in U. S. Patent 2,379,821, issued July 3, 1945, that organohalogenosilanes may be prepared by effecting reaction between a hydrocarbon and an inorganic silicon halide in the vapor phase at a temperature of at least 450° C. It has been found that this reaction proceeds too slowly at temperatures of the order of about 400–450° C. to be economically feasible. In order to obtain a rapid rate of formation of the organohalogenosilanes, it is necessary to raise the temperature of the reaction much above 450° C. Such high temperatures are quite often expensive in commercial processes and increase the amount of tarry and undesirable residues and decomposition products.

In Sauer application Serial No. 117,071, filed concurrently herewith and assigned to the same assignee as the present invention, is disclosed a method for preparing organohalogenosilanes which is an improvement over the method disclosed by Miller et al., which process comprises effecting reaction between (1) an organic hydrocarbon and (2) a halogenomonosilane containing a silicon-bonded hydrogen atom and a silicon-bonded halogen atom, the said reaction taking place in the presence of a Friedel-Crafts type catalyst for the reaction selected from the class consisting of aluminum halides, boron halides, zinc halides and mixtures thereof as well as materials which during the course of the reaction may be reduced to give any one of the aforementioned metallic halide catalysts.

If the procedures outlined in the aforementioned Sauer application are followed in connection with the preparation of arylhalogenosilanes from the reaction between an aromatic hydrocarbon and a halogenosilane of the type described above, it is found there is an equilibrium relationship between the formed products and the reactants. In the case of the preparation of phenyltrichlorosilane ($C_6H_5SiCl_3$) from an equimolecular mixture of benzene and silicochloroform ($SiHCl_3$) in the presence of $BCl_3$ as a catalyst, it is found that the equilibrium mixture contains of the order of about 29 to 30 per cent phenyltrichlorosilane. This, of course, means that regardless of the amount or ratio of ingredients used it is not feasible to obtain greater conversion of the starting materials than is permitted by means of the equilibrium relationship.

I have now discovered that I am able to obtain greater yields of organohalogenosilanes particularly from the reaction between an aromatic hydrocarbon and a halogenosilane containing at least one silicon-bonded hydrogen and at least one silicon-bonded halogen than has heretofore been possible. In accordance with my invention the initial reaction between the aromatic hydrocarbon and the above-described halogenosilane in the presence of a Friedel-Crafts type catalyst described above is conducted to form the desired aromatic halogenosilane. Thereafter, the latter composition of matter together with substantially all the evolved hydrogen, is removed from the total reaction product and to the residue is added an amount of aromatic hydrocarbon and halogenosilane (hereafter for brevity so designated for halogenosilanes containing at least one silicon-bonded hydrogen and at least one silicon-bonded halogen) equivalent to that removed in the form of evolved hydrogen and aromatic halogenosilane. If the newly added reactants are again caused to react in the presence of the residue described above, it will be found that greatly increased conversion of the newly added reactants to aromatic halogenosilanes can be realized. Moreover, if the formed halogenosilanes are again removed from the reaction product, and the cycle of adding new reactants is repeated, a still further increase in the yield of aromatic halogenosilanes is obtained. After a large number of cycles, it is possible to get very nearly quantitative conversion of the newly added reactants to aromatic halogenosilanes.

It appears generally that additional amounts of catalyst are not necessary in the second reaction between the newly added ingredients, but that the residue contains amounts of residual catalyst sufficient to effect the new reaction. This, however, does not mean that more catalyst may not be added since under many circumstances it may be desirable to do so.

The amount of catalyst used originally or later may be varied within wide limits and I do not intend to be limited to any specific proportion of catalyst. Generally, I prefer to use from about 0.1 to 5 percent, by weight, or more, of the catalyst based on the weight of the halogenosilane. On a molar basis, I may use from 0.1 to 8 mol percent, preferably from 3 to 6 mol percent catalyst, based on the mols of halogenosilane. It will, of course, be apparent to those skilled in the art that smaller or larger amounts may be employed without departing from the scope of the invention. Amounts of catalyst substantially in excess of 5 percent tend to give somewhat lower yields of organohalogenosilanes, with a resultant undesirable increase in such by-products as, for instance, $SiCl_4$ and tarry residues. Substantially anhydrous conditions should be maintained during the course of the reaction to minimize hydrolysis of the halogenosilanes comprising the reactants or the reaction product. Since additional cycles between newly added ingredients (i. e., the aromatic hydrocarbon and halogenosilane) are contemplated by my process, the amount of initial catalyst used can be varied within greater limits than when only a single cycle is contemplated. Thus, I am able to use as much as 10 percent, by weight, of catalyst based on the weight of the halogenosilane. Expressed on a molar basis the amount of catalyst employed will be proportionately higher than that described above.

Among the catalysts which may be employed in practicing my claimed invention are Friedel-Crafts type catalysts selected from the class consisting of aluminum halides (e. g., aluminum trichloride, aluminum tribromide, etc.), boron halides (e. g., boron trichloride, boron trifluoride, etc.), zinc halides (e. g., zinc chloride, zinc fluoride, etc.), mixtures of such metallic halides, and materials which as a result of the reaction with the halogenosilane are reduced to any one of the metallic halides mentioned previously (e. g., various clays containing considerable amounts of aluminum or boron, etc.). Boron compounds, particularly boron halides are preferred because of their increased catalytic effect and because they do not have to be separated from the reaction mixture before distillation. It was found that other Friedel-Crafts type catalysts such as ferric chloride were much less effective in my claimed reaction. Among the aromatic hydrocarbons which may be employed may be mentioned, for instance, benzene, toluene, xylene, ethylbenzene, naphthalene, methylnaphthalene, anthracene, etc. Good results have been obtained when the aromatic hydrocarbon employed comprises benzene.

Examples of halogenosilanes containing a silicon-bonded hydrogen and a silicon-bonded halogen which may be employed are, for instance, $SiHCl_3$, $SiH_2Cl_2$, $SiH_3Cl$, $SiHBr_3$, $CH_3SiHCl_2$, $(CH_3)_2SiHCl$, $C_{10}H_{21}SiHCl_3$, $C_6H_5SiHBr_2$, $(C_6H_5CH_2)_2SiHCl$, $CH_3C_6H_4SiHCl_2$, $(C_2H_5)SiH_2Cl$, $C_6H_{13}SiHCl_2$, $C_6H_{11}SiHCl_2$, etc. Generally, the halogenosilanes employed in the practice of this invention will conform to the formula $$SiH_m X_n R_{4-n-m}$$

where X is a halogen (for instance, chlorine, bromine, etc.), R is, for instance, a monovalent hydrocarbon radical (for instance, alkyl, aryl, aralkyl, alkaryl, alkylene, cycloaliphatic, etc. radicals), and $m$ and $n$ are each integers equal to from 1 to 3, inclusive, the total of $m$ and $n$ being equal to at most 4. In many instances, R is preferably free of olefinic unsaturation.

The preferred method of practicing my invention comprises heating a mixture of the aromatic hydrocarbon and the halogenosilane in the presence of a catalyst at a temperature of the order of from about 250° C. to below the decomposition point of the reactants and the reaction product, for example, up to about 550° to 700° C., preferably from 300° to 450° C. This is done by heating the reactants in a vessel under pressure for a period of time sufficient to cause the reaction to go to completion. Under certain conditions, depending, for example, upon the catalyst employed, the halogenosilane used, the hydrocarbon present, and the temperature of the reaction, the heating may be conducted for a period ranging from about $\frac{1}{15}$ to 12 or more hours. Generally, when the reaction is conducted under superatmospheric pressure, completion of the initial reaction, i. e., attainment of equilibrium conditions, and completion of subsequent reactions using the residue realized from the initial reaction, is effected in a relatively short period of time of the order of from about 3 to 30 minutes. However, in order to make sure the reaction has gone to completion, it may be desirable to continue the heating for an additional length of time. Reactions under pressure are preferred in my process in order to insure a more intimate contact between the reactants and the catalyst and in order to permit the reaction to go to completion faster.

The ratio of the halogenosilane to the aromatic hydrocarbon at the time of the initial reaction between the ingredients may be varied within wide limits. In the case of preparing aromatic trihalogenosilanes, these reactants are preferably present in at least an equimolar proportion. More broadly, for the preparation of other aromatic halogenosilanes, it will be apparent that the molecular ratio of the reactants will be in the proportions required by the chemical equation representing the reaction by which the aromatic halogenosilane is formed.

For instance, in the preparation of either phenyltrichlorosilane or diphenyldichlorosilane, the molar ratio of the reactants will differ according to the equations representing the formation of these compounds:

$$SiHCl_3 + C_6H_6 \rightarrow C_6H_5SiCl_3 + H_2 \quad Ratio = 1:1$$
$$SiH_2Cl_2 + 2C_6H_6 \rightarrow (C_6H_5)_2SiCl_2 + 2H_2 \quad Ratio = 1:2$$

The ratio of the reactants added after the initial cycle will be held to this fixed ratio more rigidly than the ratio of the reactants in the first cycle, the only deviation from this ratio will be that which would be required to make up accidental losses of one of the reactants. However, as will be apparent, excessive molar amounts of either the halogenosilane or the organic hydrocarbon may also be employed.

After the initial reaction between the aromatic hydrocarbon and the halogenosilane has been effected, the reaction mixture is distilled to remove the desired aromatic halogenosilane. Thereafter, the residue, i. e., all the material boiling below and above the desired aromatic halogenosilane is mixed with an amount of aromatic hydrocarbon and halogenosilane equivalent to the amount of hydrogen (which is evolved during the reaction) and the removed aromatic halogenosilane and this mixture treated in the pressure reactor again at the temperatures previously described. This removal of aromatic halogenosilane and addition of new reactants can be repeated any number of times desired with constantly improving conversions of the reactants to the desired aromatic halogenosilane.

The amount of newly added halogenosilane and aromatic hydrocarbon may be varied within moderate limits without departing from the scope of the invention. In general, the amounts of halogenosilane and aromatic hydrocarbon added in the succeeding cycles will depend upon such factors as, for instance, the stoichiometric relationships of the reactants according to the equations describing the desired reactions as illustrated by the exemplary equations shown above, the weight of the desired aromatic halogenosilane removed, the evolved hydrogen, and the manipulative losses.

Taking the preparation of $C_6H_5SiCl_3$ as a specific example, it is apparent that this compound is formed according to the equation:

$$C_6H_6 + SiHCl_3 \rightarrow H_2 + C_6H_5SiCl_3$$

After the initial reaction and removal of the evolved hydrogen and $C_6H_5SiCl_3$, the amount of $SiHCl_3$ and benzene which are to be added in substantially equimolecular proportions will be that amount which is required to make the new mixture (comprising the newly added benzene and $SiHCl_3$, and the material remaining from the previous cycle exclusive of hydrogen and $C_6H_5SiCl_3$) substantially equal in weight to the weight of the materials treated in the previous cycle.

In order that those skilled in the art may better understand how the present invention may be practiced, the following example is given by way of illustration and not by way of limitation. All parts are by weight.

*Example 1*

To a steel autoclave were charged the following ingredients:

|         | Parts | Molar ratio |
|---------|-------|-------------|
| Benzene | 312   | 1           |
| $HSiCl_3$ | 542   | 1           |
| $BCl_3$ | 8.2   |             |

The steel autoclave was closed and heated at 400° C. in all of the following tests. The autoclave was cooled to substantially room temperature and the gas produced during the reaction was passed through two low temperature traps cooled with liquid nitrogen attached to a vacuum line. After the gas had been removed, the traps were left connected until an appreciable amount of material had condensed in the traps in an amount judged to be sufficient to insure that all the condensable materials boiling below or near room temperature had been removed from the autoclave. The liquid remaining in the pressure reactor was transferred to a fractionating column and the materials boiling up to 100° C. were distilled rapidly with no attempt at separation. The distillation was continued until a cut boiling at 195–204° C. (which was identified as phenyltrichlorosilane) was obtained. This last cut was removed and all the materials boiling below phenyltrichlorosilane including the material condensed in the traps were combined with the residue remaining in the still after separation of phenyltrichlorosilane. Benzene and trichlorosilane, in equimolecular proportions and in the stipulated amount below, were added to make up the difference between the weight of the initial charge and the combined weights of the materials boiling below and above phenyltrichlorosilane. This mixture was returned to the pressure reactor and heated without any additional amount of catalyst. This procedure was followed until four cycles had been completed. The following table shows the course of the reaction by means of the weights of the various charges to the pressure reactor together with the weights of recovered materials.

*Table No. 1*

| Cycle number | 1 | 2 | 3 | 4 |
|---|---|---|---|---|
| Heating period (hours) | 16 | 2 | 1 | 6 |
| Charged (parts): |  |  |  |  |
| From previous cycle |  | 572.0 | 602.7 | 632.7 |
| Trichlorosilane | 542.0 | 184.0 | 159.8 | 128.1 |
| Benzene | 312.0 | 106.0 | 97.5 | 76.2 |
| Recovered (parts): |  |  |  |  |
| Low boilers | 448.0 | 462.0 | 507.3 | 462.0 |
| $C_6H_5SiCl_3$ | 225.5 | 226.5 | 180.0 | 230.4 |
| Residue | 124.0 | 140.7 | 158.0 | 138.0 |
| Manipulative loss | 64.7 | 30.8 | 18.3 | 20.6 |

The low yield of phenyltrichlorosilane in cycle No. 3 is attributed to the short heating period which apparently was insufficient to bring the system to equilibrium.

In order to establish that the above data demonstrates that what is claimed is actually taking place, it is desirable to assume that each cycle of the above experiment should produce approximately 226 parts of $C_6H_5SiCl_3$ which is a little short of the equilibrium amount. Using this figure it can be calculated what the yield (based on the percent of trichlorosilane converted to phenyltrichlorosilane) should be after $n$ cycles using the formula $$\text{Yield} = 100 \times \frac{145n}{542 + 145(n-1)}$$

where 542 is equal to the parts of $SiHCl_3$ in the initial charge and 145 parts is equal to the amount of $SiHCl_3$ required to produce 226 parts phenyltrichlorosilane. The observed yield may be stated in two ways. One way is to make no allowance for manipulative loss, while the other way is to correct the data for the losses by assuming that the losses are equivalent to the loss of a corresponding weight of an equimolecular mixture of trichlorosilane and benzene. The following table shows the calculated yield of phenyltrichlorosilane after employing $n$ cycles where $n$ is a whole number equal to from 1 to $\infty$.

*Table No. 2*

| Cycles | Percent Calculated yield [1] | Observed yield Excluding loss | Observed yield Including loss |
|---|---|---|---|
| 1 | 26.8 | 28.5 | 26.8 |
| 2 | 42.2 | 43.1 | 40.0 |
| 3 | 52.3 | 49.7 | 45.6 |
| 4 | 59.4 | 60.4 | 55.1 |
| 5 | 64.6 |  |  |
| 10 | 78.5 |  |  |
| 20 | 88.0 |  |  |
| ∞ | 100.0 |  |  |

[1] Mols $C_6H_5SiCl_3$ recovered / Mols of $SiHCl_3$ introduced in process.

It will, of course, be apparent to those skilled in the art that other aromatic hydrocarbons, halogenosilanes and catalysts of the class described above together with varying conditions of reaction may also be employed. Many examples of other ingredients which may be used have been enumerated previously. In addition, instead of using a batch process as illustrated by the foregoing example, a continuous process for conducting the reaction can also be used without departing from the scope of my claimed invention. My invention when used to supplement that disclosed and claimed in the aforementioned Sauer application permits the preparation of aromatic halogenosilanes economically.

Although temperatures of the order of about 400° C. have been disclosed in the above example, it will be apparent that higher or lower temperatures may be employed without departing from the scope of the claimed invention. The upper limit of the temperature range is generally determined by the stability of the reactants under the reaction conditions as well as the stability of the reaction product. Usually this upper limit is one below which undesirable decomposition of either the reactants or the reaction product takes place.

The formed aromatic halogenosilanes have many uses, for instance, as water repellents or as intermediates in the preparation of various organopolysiloxane resins, oils and rubbers.

What I claim as new and desire to secure by Letters Patent of the United States is:

1. The method for obtaining aromatic halogenosilanes which comprises (1) effecting reaction between (a) an aromatic hydrocarbon selected from the class consisting of benzene and toluene and (b) a halogenosilane corresponding to the general formula $SiH_mX_nR_{4-n-m}$ where X is a halogen, R is a monovalent hydrocarbon radical, and $m$ and $n$ are each integers equal to from 1 to 3, inclusive, the total of $m$ and $n$ being equal to at most 4, said reaction being effected in the presence of a Friedel-Crafts type catalyst selected from the class consisting of halides of aluminum, halides of boron, halides of zinc, and mixtures thereof, (2) removing the formed hydrogen and the desired formed aromatic halogenosilane from the reaction product, (3) adding to the balance of the reaction product consisting essentially of material boiling above and below the boiling point of the desired formed aromatic halogenosilane an amount of aromatic hydrocarbon and halogenosilane described above at least substantially equal to the decrease in weight caused by the removal of evolved hydrogen and desired aromatic halogenosilane from the previously treated reaction mixture and in the stoichiometric proportions required for the formation of the desired aromatic halogenosilane, and (4) effecting reaction again between the newly added ingredients in the presence of the balance of the aforesaid reaction product to form additional quantities of aromatic halogenosilane.

2. The method for obtaining phenylhalogenosilanes which comprises (1) effecting reaction by heating a mixture comprising (a) benzene and (b) a halogenosilane corresponding to the general formula $SiH_mX_nR_{4-n-m}$ where X is a halogen, R is a monovalent hydrocarbon radical, and $m$ and $n$ are each integers equal to from 1 to 3, inclusive, the total of $m$ and $n$ being equal to at most 4, said reaction being effected in the presence of a Friedel-Crafts type catalyst selected from the class consisting of halides of aluminum, halides of boron, halides of zinc, and mixtures thereof, (2) removing the formed hydrogen and the desired formed phenylhalogenosilane from the reaction product, (3) adding to the balance of the reaction product consisting essentially of the material boiling above and below the desired formed phenylhalogenosilane an amount of benzene and halogenosilane described above at least substantially equal to the decrease in weight caused by the removal of evolved hydrogen and desired phenylhalogenosilane from the previously treated reaction mixture and in the stoichiometric proportions required for the formation of the desired phenylhalogenosilane, and (4) effecting reaction again between the newly added ingredients in the presence of the balance of the aforesaid reaction product to form additional quantities of phenylhalogenosilane.

3. The method for obtaining aromatic chlorosilanes which comprises (1) effecting reaction by heating a mixture comprising (a) an aromatic hydrocarbon selected from the class consisting of benzene and toluene and (b) trichlorosilane, said reaction being effected in the presence of a Friedel-Crafts type catalyst selected from the class consisting of halides of aluminum, halides of boron, halides of zinc, and mixtures thereof, (2) removing the formed hydrogen and the desired formed aromatic chlorosilane from the reaction product, (3) adding to the balance of the reaction product consisting essentially of material boiling above and below the boiling point of the desired formed aromatic chlorosilane an amount of aromatic hydrocarbon and trichlorosilane described above at least substantially equal to the decrease in weight caused by the removal of evolved hydrogen and desired aromatic chlorosilane from the previously treated reaction mixture and in the stoichiometric proportions required for the formation of the desired aromatic chlorosilane, and (4) effecting reaction again between the newly added ingredients in the presence of the balance of the aforesaid reaction product to form additional quantities of aromatic chlorosilane.

4. The method for obtaining phenylchlorosilanes which comprises (1) effecting reaction by heating a mixture comprising (a) benzene and (b) trichlorosilane, said reaction being effected in the presence of a Friedel-Crafts type catalyst selected from the class consisting of halides of aluminum, halides of boron, halides of zinc, and mixtures thereof, (2) removing the formed hydrogen and the desired formed phenylchlorosilane from the reaction product, (3) adding to the balance of the reaction product consisting essentially of material boiling above and below the boiling point of the desired formed phenylchlorosilane an amount of benzene and trichlorosilane at least substantially equal to the decrease in weight caused by the removal of evolved hydrogen and desired phenylchlorosilane from the previously treated reaction mixture and in the stoichiometric proportions required for the formation of the desired phenylchlorosilane, and (4) effecting reaction again between the newly added ingredients in the presence of the balance of the aforesaid reaction product to form additional quantities of phenylchlorosilane.

5. The method for obtaining phenylchlorosilanes which comprises (1) effecting reaction between (a) benzene and (b) trichlorosilane, said reaction being effected in the presence of boron trichloride as a catalyst, (2) removing the formed hydrogen and the desired formed phenylchlorosilane from the reaction product, (3) adding to the balance of the reaction product consisting essentially of material boiling above and below the boiling point of the desired formed phenylchlorosilane an amount of benzene and trichlorosilane at least substantially equal to the decrease in weight caused by the removal of evolved hydrogen and desired phenylchlorosilane from the previously treated reaction mixture and in the stoichiometric proportions required for the formation of the desired phenylchlorosilane, and (4) effecting reaction again between the newly added ingredients in the presence of the balance of the aforesaid reaction product to form additional quantities of phenylchlorosilane.

6. The method for obtaining tolylchlorosilanes which comprises (1) effecting reaction between (a) toluene and (b) trichlorosilane, said reaction being effected in the presence of boron trichloride as a catalyst, (2) removing the formed hydrogen and the desired formed tolylchlorosilane from the reaction product, (3) adding to the balance of the reaction product consisting essentially of material boiling above and below the boiling point of the desired formed tolylchlorosilane an amount of toluene and trichlorosilane at least substantially equal to the decrease in weight caused by the removal of evolved hydrogen and desired tolylchlorosilane from the previously treated reaction mixture and in the stoichiometric proportions required for the formation of the desired tolylchlorosilane, and (4) effecting reaction again between the newly added ingredients in the presence of the balance of the aforesaid reaction product to form additional quantities of tolylchlorosilane.

7. The method for obtaining phenylchlorosilanes which comprises (1) effecting reaction between (a) benzene and (b) dichlorosilane, said reaction being effected in the presence of boron trichloride as a catalyst, (2) removing the formed hydrogen and the desired formed phenylchlorosilane from the reaction product, (3) adding to the balance of the reaction product consisting essentially of material boiling above and below the boiling point of the desired formed phenylchlorosilane an amount of benzene and dichlorosilane at least substantially equal to the decrease in weight caused by the removal of evolved hydrogen and desired phenylchlorosilane from the previously treated reaction mixture and in the stoichiometric proportions required for the formation of the desired phenylchlorosilane, and (4) effecting reaction again between the newly added ingredients in the presence of the balance of the aforesaid reaction product to form additional quantities of phenylchlorosilane.

8. The method for obtaining phenyltrichlorosilane which comprises (1) heating at a temperature of from 300° to 450° C. a mixture of ingredients comprising (a) benzene and (b) trichlorosilane, said reaction being conducted in the presence of a catalyst comprising boron trichloride in an amount equal to from 0.1 to 10 percent, by weight, based on the weight of the formed hydrogen and the trichlorosilane, (2) removing the formed phenyltrichlorosilane from the reaction product, (3) adding to the balance of the reaction product consisting essentially of material boiling above and below the boiling point of the phenyltrichlorosilane an amount of benzene and trichlorosilane at least substantially equal to the decrease in weight caused by the removal of evolved hydrogen and phenyltrichlorosilane from the previously treated reaction mixture and in the stoichiometric proportions required for the formation of phenyltrichlorosilane, and (4) again heating the mixture of newly added ingredients in the presence of the balance of the aforesaid reaction product at the above-described temperature to form additional quantities of phenyltrichlorosilane.

STUART D. BREWER.

REFERENCES CITED

The following references are of record in the file of this patent:

UNITED STATES PATENTS

| Number | Name | Date |
| --- | --- | --- |
| 2,208,769 | McKeon | July 23, 1940 |
| 2,500,652 | Barry | Mar. 14, 1950 |